(12) United States Patent
Sumiyoshi et al.

(10) Patent No.: US 6,830,825 B2
(45) Date of Patent: Dec. 14, 2004

(54) EPOXY RESIN COMPOSITION AND SEMICONDUCTOR DEVICE

(75) Inventors: Takafumi Sumiyoshi, Tokyo (JP); Ayako Mizushima, Tokyo (JP); Ken Oota, Tokyo (JP); Yoshio Fujieda, Tokyo (JP); Hiroki Nikaido, Tokyo (JP); Takashi Aihara, Tokyo (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 0 days.

(21) Appl. No.: 10/275,018

(22) PCT Filed: Nov. 20, 2001

(86) PCT No.: PCT/JP01/10139

§ 371 (c)(1),
(2), (4) Date: Oct. 31, 2002

(87) PCT Pub. No.: WO02/090434

PCT Pub. Date: Nov. 14, 2002

(65) Prior Publication Data

US 2003/0187107 A1 Oct. 2, 2003

(30) Foreign Application Priority Data

Apr. 23, 2001 (JP) ........................................ 2001-123798
Aug. 27, 2001 (JP) ........................................ 2001-256172
Sep. 10, 2001 (JP) ........................................ 2001-273216

(51) Int. Cl.$^7$ ............................................. H01L 29/12
(52) U.S. Cl. .................. 428/620; 523/451; 523/457; 523/458; 523/460; 523/466; 525/476; 525/523; 528/89; 528/108
(58) Field of Search .................. 428/620; 523/457, 523/458, 460, 451, 466; 525/476, 523, 538, 540, 529; 528/89, 108, 116, 407, 408, 418, 51

(56) References Cited

U.S. PATENT DOCUMENTS 6,284,818 B1 * 9/2001 Kawata et al. ............... 523/451
6,632,881 B1 * 10/2003 Tsuchida et al. .............. 525/65

FOREIGN PATENT DOCUMENTS

| JP | 55-146950 | 8/1981 |
| JP | 61-53321 | 12/1987 |
| JP | 2000-309685 | 11/2000 |

OTHER PUBLICATIONS

International Search Report, dated May 24, 2002, for PCT Application No. PCT/JP01/10139, pp. 1–3.

* cited by examiner

*Primary Examiner*—Margaret G. Moore
*Assistant Examiner*—D. Aylward
(74) *Attorney, Agent, or Firm*—Smith, Gambrell & Russell, LLP

(57) ABSTRACT

An epoxy resin composition for encapsulation of semiconductors which contains substantially no halogen-based flame retarding agents or antimony compounds having properties of moldability, flame retardance, high-temperature storage characteristics, reliability for moisture resistance, and solder cracking resistance. The epoxy resin composition for encapsulating semiconductors contains (A) an epoxy resin, (B) a phenolic resin, (C) a curing accelerator, (D) an inorganic filler and (E) a phosphazene compound as essential components, the total weight of phosphate ion and phosphite ion contained in the phosphazene compound being not more than 500 ppm. Further, the epoxy resin composition may optionally contain a flame-retarding assistant or an ion scavenger.

13 Claims, No Drawings

EPOXY RESIN COMPOSITION AND SEMICONDUCTOR DEVICE

TECHNICAL FIELD

The present invention relates to an epoxy resin composition for encapsulating semiconductors which contains substantially neither halogen-based flame-retarding agents nor antimony compounds and is excellent in solder reflowing resistance, flame retardance and high-temperature storage characteristics, and to a semiconductor device.

BACKGROUND ART

Hitherto, electronic parts such as diodes, transistors and integrated circuits have been encapsulated mainly with epoxy resin compositions. These epoxy resin compositions usually contain bromine atom-containing flame retarding agents, and antimony compounds such as antimony trioxide, antimony tetroxide and antimony pentoxide for the purpose of imparting flame retardance. However, with a worldwide increase of consciousness for environmental protection, there is a great demand for epoxy resin compositions having flame retardance which contain neither halogen-based flame-retarding agents nor antimony compounds.

Moreover, it is known that if semiconductor devices encapsulated with epoxy resin compositions containing halogen-based flame-retarding agents and antimony compounds are stored at high temperatures, halides produced owing to heat decomposition of these flame-retarding agents are liberated and corrode the bonding pad portions of semiconductor elements to damage the reliability of semiconductor devices. Thus, epoxy resin compositions are desired which can attain degree of flame retardance of V-0 in UL-94 without using halogen-based flame-retarding agents and antimony compounds as flame-retarding agents.

Corrosion resistance of bonding pad portions of semiconductor elements after semiconductor devices are stored at high temperatures (e.g., 185° C.) is called high-temperature storage characteristics, and as methods for improving the high-temperature storage characteristics, there are proposed a method of using diantimony pentoxide (JP-A-55-146950), a method of using antimony oxide and an organic phosphine in combination (JP-A-61-53321), and the like, and effects of these methods have been confirmed. However, some of epoxy resin compositions are still unsatisfactory for the high level recently required for high-temperature storage characteristics of semiconductor devices.

Various flame-retarding agents have been investigated for these demands. For example, metal hydroxides such as aluminum hydroxide, magnesium hydroxide and the like, and boron compounds have been investigated, but these compounds do not develop the effect of flame retarding unless they are used in large amounts, and, besides, they may deteriorate curability. Furthermore, under the present circumstances where surface packaging of semiconductor devices are generally carried out, if semiconductor devices which have absorbed moisture are exposed to high temperatures at the time of soldering, explosive stress of water vapor produced by vaporization causes cracking of package or delamination at the interface between semiconductor elements or lead frames and semiconductor encapsulating materials, resulting in troubles of the electrical reliability being severely damaged. Thus, a great task is to inhibit these troubles, namely, to improve solder resistance. Moreover, in view of the recent environmental problems, there is a tendency to use no lead in solders used for mounting of semiconductor devices, and, as a result, it is unavoidable that the temperature for solder reflowing treatment rises and it is considered that solder resistance required will become severer.

In order to improve the solder reflowing resistance, it has been attempted to add inorganic fillers in large amounts to epoxy resin compositions for encapsulation of semiconductors, thereby to reduce absorption of moisture and heat expansion of the semiconductor devices using the compositions and to increase strength of the semiconductor devices. Therefore, there are generally employed, for example, a means of using epoxy resins of low viscosity type or crystalline epoxy resins which are crystalline at room temperature, but which show extremely low viscosity at temperatures higher than melting point, thereby to inhibit reduction of fluidity of epoxy resin compositions at molding which is caused by increase of the amount of inorganic fillers added, or a means of using phenolic resins or epoxy resins in which the resin skeleton per se is hydrophobic and the cured products of which also show low moisture absorption.

Because of low glass transition temperatures, crystalline epoxy resins, hydrophobic epoxy resins and phenolic resins tend to deteriorate in high-temperature storage characteristics, and for improving the characteristics, there are requested compositions using neither halogen-based flame-retarding agents nor antimony compounds.

Furthermore, since the crystalline epoxy resins are low in viscosity, they are low in curability, and since the hydrophobic epoxy resins and the phenolic resins have a molecular structure long in distance between cross-linking points, cured products thereof are soft, and use of flame-retarding agents which hinder curing of the epoxy resins is difficult for increasing productivity by improving release properties at molding.

That is, it is demanded to provide an epoxy resin composition which maintains flame retardance, is excellent in moldability, solder reflowing resistance and high-temperature storage characteristics, and uses substantially neither halogen-based flame-retarding agents nor antimony compounds.

DISCLOSURE OF INVENTION

The present invention provides an epoxy resin composition for encapsulating semiconductors which contains substantially neither halogen-based flame-retarding agents nor antimony compounds and is excellent in moldability, flame retardance, solder reflowing resistance and high-temperature storage characteristics, and furthermore provides a semiconductor device made by encapsulating semiconductor elements with the epoxy resin composition.

The present invention is an epoxy resin composition for encapsulating semiconductors which comprises (A) an epoxy resin, (B) a phenolic resin, (C) a curing accelerator, (D) an inorganic filler and (E) a phosphazene compound as essential components, wherein the total weight of phosphate ion and phosphite ion contained in the phosphazene compound is not more than 500 ppm.

A more preferred embodiment is the epoxy resin composition for encapsulating semiconductors in which the phosphazene compound has a melt viscosity of $0.7 \times 10^{-2}$ to $5 \times 10^{-2}$ Pa·s at 150° C.

Another preferred embodiment is the epoxy resin composition for encapsulating semiconductors in which the phosphazene compound is a cyclic phosphazene compound represented by the following formula (1):

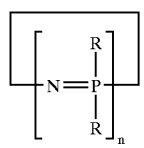
(1)

wherein n is an integer of 3–7, and R's denote same or different organic groups which are selected from alkyl groups, alkenyl groups, alkoxy groups, aryl groups, aryloxy groups, polyoxyalkylene groups, these groups in which at least one hydrogen atom is substituted with a group having N, S, O or F atom, amino groups, fluoroalkyl groups and fluoroalkyloxy groups. These phosphazene compounds may be used each alone or in admixture.

Another preferred embodiment is the epoxy resin composition for encapsulating semiconductors wherein at least n of 2n R's in the cyclic phosphazene compound represented by the formula (1) are phenoxy groups, or wherein at least one of 2n R's in the cyclic phosphazene compound represented by the formula (1) is an amino group or a polyoxyalkylene group.

Another preferred embodiment is the epoxy resin composition for encapsulating semiconductors in which the epoxy resin (A) is at least one resin selected from epoxy resins represented by the following formulas (2)–(6):

(2)

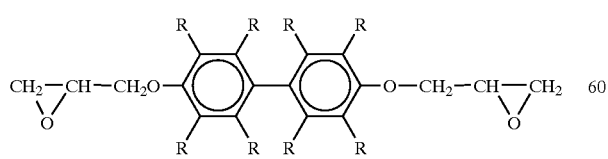

wherein R's denote hydrogen or an alkyl group of 1–4 carbon atoms and may be the same or different,

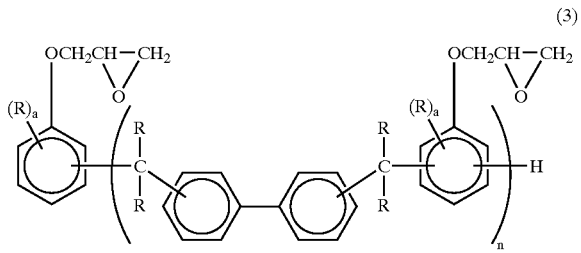
(3)

wherein R's denote hydrogen or an alkyl group of 1–4 carbon atoms and may be the same or different, a is 0 or a positive number of 1–4, and n is a positive number of 1–10 as an average value,

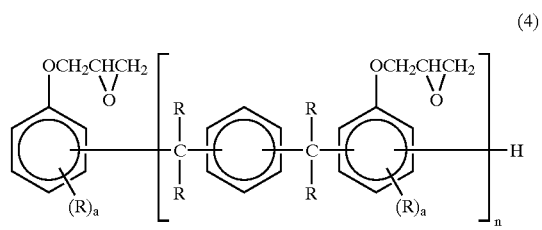
(4)

wherein R's denote hydrogen or an alkyl group of 1–4 carbon atoms and may be the same or different, a is 0 or a positive number of 1–4, and n is a positive number of 1–10 as an average value,

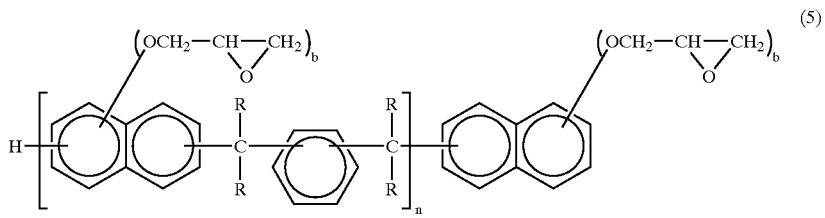
(5)

wherein R's denote an alkyl group of 1–4 carbon atoms and may be the same or different, b is 1 or 2, and n is 0 or a positive number of 1–10 as an average value, and

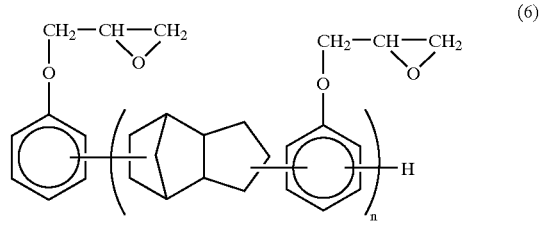
(6)

wherein n is a positive number of 1–10 as an average value.

Another preferred embodiment is the epoxy resin composition for encapsulating semiconductors in which the phenolic resin (B) is at least one resin selected from phenolic resins represented by the following formulas (7)–(9):

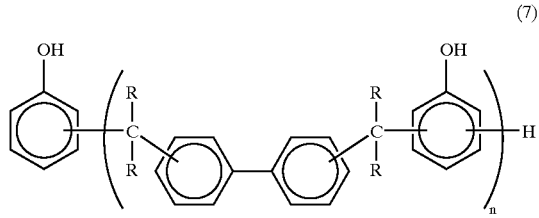
(7)

wherein R's denote hydrogen or an alkyl group of 1–4 carbon atoms and may be the same or different, and n is a positive number of 1–10 as an average value,

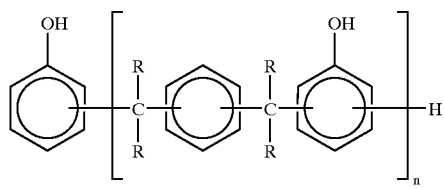
(8)

wherein R's denote hydrogen or an alkyl group of 1–4 carbon atoms and may be the same or different, and n is a positive number of 1–10 as an average value, and

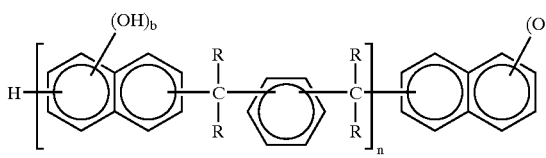
(9)

wherein R's denote an alkyl group of 1–4 carbon atoms and may be the same or different, b is 1 or 2, and n is 0 or a positive number of 1–10 as an average value.

Another preferred embodiment is the epoxy resin composition for encapsulating semiconductors which contains a flame-retarding assistant. Another preferred embodiment is the epoxy resin composition for encapsulating semiconductors in which the flame-retarding assistant is at least one metal compound selected from metal hydroxides, zinc borate, zinc molybdate and metal complexes. Another preferred embodiment is the epoxy resin composition for encapsulating semiconductors in which the flame-retarding assistant is at least one compound selected from aluminum hydroxide, magnesium hydroxide and a metal hydroxide solid solution represented by the following formula (10):

$$Mg_{1-x}M_x(OH)_2 \quad (10)$$

wherein M denotes at least one divalent metal selected from the group consisting of Mn, Fe, Co, Ni, Cu and Zn, and x denotes a number of $0.01 \leq x \leq 0.5$. Further preferred embodiment is the epoxy resin composition for encapsulating semiconductors in which the metal complex is a metal complex formed by coordinating a ligand selected from naphthenic acid, acetylacetonato, phthalocyanine and thiocyanic acid with a metal element selected from the group consisting of Co, Cu, Zn, Ni, Mn and Fe, or the flame-retarding assistant is a polyorganosiloxane represented by the following formula (11):

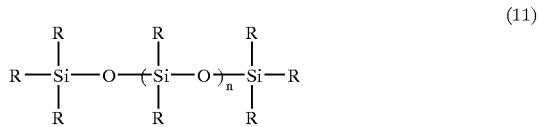
(11)

wherein R's denote a monovalent organic group, 30–100% by weight of all the organic groups are phenyl groups and the remaining organic groups are at least one group selected from vinyl group-substituted organic groups, alkylalkoxy groups of 1–6 carbon atoms, alkyl groups of 1–6 carbon atoms, amino group-substituted organic groups, epoxy group-substituted organic groups, hydroxyl group-substituted organic groups and mercapto group-substituted organic groups, and n is a positive number of 5–100 as an average value.

Another preferred embodiment is the epoxy resin composition for encapsulating semiconductors which contains at least one ion scavenger selected from a compound represented by the following formula (12), a compound represented by the following formula (13) and zinc oxide in an amount of 0.01–1.0% by weight in the total epoxy resin composition:

$$Mg_aAl_b(OH)_{2a+3b-2c}(CO_3)_c \cdot dH_2O \quad (12)$$

wherein $0 < b/a \leq 1$, $0 \leq c/b < 1.5$, and d is 0 or a positive integer, and $$BiO_a(OH)_b(NO_3)_c(HSiO_3)_d \quad (13)$$

wherein $a=0.9–1.1$, $b=0.6–0.8$, $c+d=0.2–0.4$, and $d/c=0–2.0$.

Another preferred embodiment is the epoxy resin composition for encapsulating semiconductors in which an amount of bromine atom and that of antimony atom contained in the total epoxy resin composition is less than 0.1% by weight, respectively.

Another embodiment is a semiconductor device in which semiconductor elements are encapsulated with the above epoxy resin composition for encapsulating semiconductors.

DETAILED DESCRIPTION OF THE INVENTION

The epoxy resins used in the present invention include all of monomers, oligomers and polymers having 2 or more epoxy groups in one molecule, and molecular weight and molecular structure thereof are not particularly limited. As examples of the epoxy resins, mention may be made of biphenyl type epoxy resins, bisphenol type epoxy resins, stilbene type epoxy resins, phenolic novolak type epoxy resins, cresol novolak type epoxy resins, triphenolmethane type epoxy resins, alkyl-modified triphenolmethane type epoxy resins, triazine nucleus-containing epoxy resins, dicyclopentadiene-modified phenolic type epoxy resins, phenolaralkyl type epoxy resins (having phenylene skeleton, diphenylene skeleton, etc.), naphthol type epoxy resins, and the like. These may be used each alone or in admixture.

Among these epoxy resins, the crystalline epoxy resins of the formula (2) which are low in viscosity at melting, are preferred because they assist reduction in moisture absorption and increase in flame retardance by incorporating a large amount of fillers. Furthermore, since resin skeletons of the epoxy resins represented by the formulas (3)–(6) have hydrophobic properties, their cured products show low moisture absorption and, besides, the distance between cross-linking points of the cured products is long, and therefore, they have the feature of low elasticity at solder reflowing temperature and, hence, the stress generated is low and adhesion properties are superior and thus solder reflowing resistance is good. Therefore, these epoxy resins are preferred. Especially, since the epoxy resins of the formulas (3)–(5) are high in the content of aromatic ring in the resin skeleton, flame retardance of the resins per se is also high and they have the feature that amount of flame-retarding agent added can be reduced.

The phenolic resins used in the present invention include all of monomers, oligomers and polymers having 2 or more phenolic hydroxyl groups in one molecule, and molecular weight and molecular structure thereof are not particularly limited. As examples of the phenolic resins, mention may be made of phenolic novolak resins, cresol novolak resins, dicyclopentadiene-modified phenolic resins, terpene-modified phenolic resins, triphenolmethane type resins, phenolaralkyl resins (having phenylene skeleton, diphenylene skeleton, etc.), naphtholaralkyl resins, and the like. These may be used each alone or in admixture.

Especially, since resin skeleton of the phenolic resins represented by the formulas (7)–(9) is hydrophobic, their cured products show low moisture absorption and, besides, the distance between cross-linking points of the cured products is long, and therefore, they have the feature of low elasticity at solder reflowing temperature and, hence, the stress generated is low and adhesion is superior and thus solder reflowing resistance is good. Thus, these phenolic resins are preferred. Furthermore, since these phenolic resins are high in the content of aromatic ring in the resin skeleton, flame retardance of the resins per se is high and they have the feature that amount of the flame-retarding agent added can be reduced.

Blending ratio of the epoxy resin and the phenolic resin is preferably such that the ratio of the number of epoxy groups in the whole epoxy resin and the number of phenolic hydroxyl groups in the whole phenolic resin is in the range of 0.8–1.3. If the ratio is lower than 0.8, curability and heat resistance of the cured products deteriorate and moisture absorption rate increases, and if it exceeds 1.3, heat resistance and flame resistance of the cured products deteriorate.

The epoxy resin is contained in an amount of 3–12% by weight, preferably 4–8% by weight in the total epoxy resin composition, and the phenolic resin is contained in an amount of 3–10% by weight, preferably 4–7% by weight in the total epoxy resin composition. If the amount of the epoxy resin is less than 3% by weight or that of the phenolic resin is less than 3% by weight, fluidity of the resin composition at molding is deteriorated to cause failure in filling or deformation of gold wires. If the amount of the epoxy resin exceeds 12% by weight or that of the phenolic resin exceeds 10% by weight, water absorption of the epoxy resin composition after molded increases and, besides, flame retardance is deteriorated.

The curing accelerators used in the present invention can be any of those which can accelerate curing reaction between epoxy group and phenolic hydroxyl group, and those which are generally used for encapsulating materials can be used. Examples of them are 1,8-diazabicyclo(5,4,0)undecene-7, triphenyl phosphine, 2-methylimidazole, tetraphenylphosphonium tetraphenyl borate, and the like. These may be used each alone or in admixture.

The curing accelerator is contained in an amount of 0.05–1.0% by weight, preferably 0.15–0.6% by weight in the total epoxy resin composition. If the amount of the curing accelerator is less than 0.05% by weight, curing proceeds slowly, and, hence, moldability decreases, molded products are broken at removing of them, the resin composition remains in the mold, and the productivity is conspicuously deteriorated. If the amount exceeds 1.0% by weight, curability of the epoxy resin composition increases much, and, hence, reaction proceeds during heating and kneading of the resin composition to form gelled products, or fluidity of the resin composition at molding is much lowered to cause failure in filling or deformation of gold wires.

The inorganic fillers used in the present invention can be those which are generally used for encapsulating materials. Examples of them are fused silica, crystalline silica, talc, alumina, silicon nitride, and the like. These may be used each alone or in admixture. Amount of the inorganic fillers added is preferably 60–95% by weight in the total epoxy resin composition from the point of balancing between moldability and solder resistance. If the amount is less than 60% by weight, solder resistance decreases due to increase of moisture absorption and if it exceeds 95% by weight, there occur problems in moldability such as wire sweeping and pad shifting.

The phosphazene compounds used in the present invention have the structure of skeleton shown by the formula (14) and act as flame-retarding agents. The flame-retarding action is presumed to be exerted as follows. Carbonization with phosphorus in the compounds is accelerated, that is, an incombustible carbonized layer is formed on the surface of the cured product of the epoxy resin composition, and this layer protects the surface of the cured product and intercepts oxygen, and, furthermore, nitrogen gas is generated upon heat decomposition of the compound and this gas in vapor phase also intercepts oxygen. It is considered that the phosphazene compounds impart a high flame retardance due to the flame retarding effect caused by the actions in both the solid phase and the vapor phase.

Particular characteristic of the manner of impartation of flame retardance by the phosphazene compounds is that flame retardance of molded products which are thin in thickness is superior. In general, flame retardance is improved by combining resins of high aromatic content as epoxy resins or phenolic resins. A flame retardance of V-0 rank can be sometimes obtained without using a flame retarding agent for test pieces of 3.2 mm thick, which are molded products thick in thickness, in flame retardance test of UL94, while it is sometimes difficult to obtain a flame retardance of even V-1 rank for test pieces of thin thickness, for example, 1.0 mm.

It has been found that by adding the phosphazene compounds, a flame retardance of V-0 rank can be obtained for test pieces of 1.0 mm thick even with addition of the compounds in a small amount. This impartation of a high flame retardance to molded products of thin thickness can hardly be attained with flame retarding agents other than the phsophazene compounds.

The phsophazene compounds having a skeleton shown by the formula (14) include straight chain compounds and cyclic compounds.

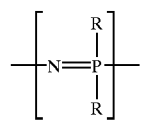
(14)

As R's in the formula (14), mention may be made of same or different organic groups which are selected from alkyl groups, alkenyl groups, alkoxy groups, aryl groups, aryloxy groups, polyoxyalkylene groups, these groups in which at least one hydrogen atom is substituted with a group having N, S, O or F atom, amino groups, fluoroalkyl groups and fluoroalkyloxy groups, and as groups having N, S, O or F atom, there are, for example, amino group, fluoroalkyl group, mercapto group, hydroxyl group, and the like.

Phosphazene compounds sometimes contain hydrolyzable groups resulting from side reaction products contained at the time of synthesis reaction. Since the groups produce phosphate ion and phosphite ion upon hydrolysis, in the semiconductor devices in which semiconductor elements are encapsulated with an epoxy resin composition containing a phosphazene compound, phosphate ion and phosphite ion are gradually produced by absorption of moisture and, hence, they corrode aluminum circuit of the elements or adhesion at the interface of the metal and the cured product of the epoxy resin composition tends to be deteriorated.

Therefore, the total weight of phosphate ion and phosphite ion contained in a phosphazene compound is preferably not more than 500 ppm based on the phosphazene compound, and particularly it is most preferred to reduce the total weight to nearly 0 by carrying out purification repeatedly. If the total weight of phosphate ion and phosphite ion exceeds 500 ppm, corrosion of metallic circuits of elements occurs, and adhesion between the cured product of the epoxy resin composition and the metal is deteriorated, and this is not preferred. Amounts of the phosphate ion and phosphite ion contained in the phosphazene compound can be determined by dispersing the phosphazene compound in water in a closed pressure vessel and then subjecting to extraction with water under the condition of saturated vapor pressure (2.3 atm.) of 125° C. The extraction is carried out under the condition that the total of the extraction amounts of phosphate ion and phosphite ion is saturated. In general, extraction for 50–200 hours is sufficient.

It is preferred to use the phosphazene compounds represented by the formula (14) having a melt viscosity of $0.7 \times 10^{-2}$ to $5 \times 10^{-2}$ Pa·s at 150° C. The phosphazene compounds having a melt viscosity of less than $0.7 \times 10^{-2}$ Pa·s at 150° C. are not preferred because they cause deterioration of curability of the epoxy resin compositions, and cross-linking density and strength decrease much. Those which have a melt viscosity exceeding $5 \times 10^{-2}$ Pa·s are not preferred because they are high in molecular weight and impurities are incorporated in large amounts at the time of synthesis thereof to tend to cause deterioration of heat resistance and increase of moisture absorption.

Measurement of the melt viscosity at 150° C. in the present invention is conducted for a sample molten at the measuring part heated at 150° C. using an ICI cone plate viscometer manufactured by MTS Engineering Co., Ltd.

The straight chain phosphazene compounds having a skeleton shown by the formula (14) are represented by the formula (15) wherein n is an integer of 3–1000, and $R_1$'s mean same or different organic groups which are selected from alkyl groups, alkenyl groups, alkoxy groups, aryl groups, aryloxy groups, polyoxyalkylene groups, these groups in which at least one hydrogen atom is substituted with a group having N, S, O or F atom, amino groups, fluoroalkyl groups and fluoroalkyloxy groups, and as the groups having N, S, O or F atom, there are, for example, amino group, fluoroalkyl group, mercapto group, hydroxyl group, and the like. Of these groups, aryloxy group is preferred from the points of heat resistance and moisture resistance, and it is desirable that at least n of 2n $R_1$'s are phenoxy groups from the points of compatibility with the resin components and fluidity of the epoxy resin composition.

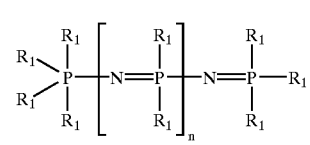
(15)

From the point of fluidity of the epoxy resin composition, as the cyclic phosphazene compounds having a skeleton shown by the formula (14), the phosphazene compounds represented by the formula (1) are preferred and n is an integer of 3–7 and R is the same as $R_1$ in the formula (15).

Of the groups, aryloxy group is preferred from the points of heat resistance and moisture resistance, and it is desirable that at least n of 2n R's are phenoxy groups from the points of compatibility with the epoxy resin and fluidity of the epoxy resin composition. More preferred are those which have a 6-membered ring of trimer as a main component.

Cyclic phosphazene compounds in which at least one of 2n R's is a polyoxyalkylene group improve compatibility with the epoxy resin, resulting in improvement of flame retardance and hot strength of cured products of the epoxy resin composition. On the other hand, polyoxyalkylene group causes high moisture absorption and the number of them is preferably n or less.

Moreover, cyclic phosphazene compounds in which at least one of 2n R's has an amino group form a chemical bond between the epoxy resin and the phosphazene compound and, hence, improve hot strength of cured products of the epoxy resin composition and reflowing resistance. On the other hand, when the number of amino groups increases, fluidity of the epoxy resin composition at the time of molding is deteriorated and thus the number of them is preferably n or less.

Examples of the cyclic phosphazene compounds represented by the formula (1) are hexapropylcyclotriphosphazene, tetraethoxydipropoxycyclotriphosphazene, hexaphenoxycyclotriphosphazene, triphenoxytrianilinocyclotriphosphazene, bis(oxypolypropylene glycol)tetraphenoxytriphosphazene, hexakis(3-mercaptopropyl)cyclotriphosphazene, hexakis(heptafluoropropyloxy)cyclotriphosphazene, and the like.

Other preferred cyclic phosphazene compounds included in the present invention are those compounds comprising one cyclic phosphazene bonded to another cyclic phosphazene through another organic group in order to obtain higher flame retardance. For example, these compounds have a structure in which a part of R's of the cyclic phophazene compound represented by the formula (1) and a part of R's of another cyclic phosphazene compound are substituted with a divalent organic group whereby these cyclic phosphazene compounds are bonded, and as the divalent organic group which bonds both the cyclic phosphazene compounds, preferred are those groups formed by removing two hydrogen atoms from hydroxyl groups of diol compounds such as 1,6-dioxyhexane and those groups formed by removing two hydrogen atoms from bifunctional phenolic compounds such as hydroquinone, 4,4'-biphenol and bisphenol F. Both the cyclic phosphazene compounds may be the same or different.

The structures of cyclic phosphazene compounds being bonded to each other are exemplified by the formulas (16) and (17), but are not limited by the structures of these formulas. The phosphazene compounds are disclosed in JP-A-55-27344, JP-A-11-181429, etc.

Melting point of the phosphazene compounds of the present invention is preferably 60–150° C. If the melting point is lower than 60° C., there are problems that these phosphazene compounds bleed to the surface of molded products at the time of molding of the epoxy resin compositions to stain the molded products or molds and, besides, deteriorate hot strength of the cured products of the epoxy resin compositions. If the melting point is higher than 150° C., there are problems that they deteriorate in compatibility with the resin to cause increase of variation of flame resistance and deterioration of fluidity of the epoxy resin compositions at molding.

Amount of the phosphazene compounds of the present invention is preferably 0.01–5% by weight, more preferably 0.1–2% by weight in the whole epoxy resin composition. If the amount is less than 0.01% by weight, flame retardance is insufficient, and if it exceeds 5% by weight, curability, heat resistance and strength are deteriorated and moisture absorption rate increases. The phosphazene compounds may be used each alone or in admixture.

The epoxy resin composition of the present invention can contain a flame retarding assistant for the purpose of improving flame retardance in addition to the components (A)–(E). In order to attain flame retardance of the epoxy resin composition with addition of the flame retarding assistant alone, it must be added in a large amount. Addition of it in a large amount causes deterioration in curability and fluidity, increase in moisture absorption rate and reduction in strength of the epoxy resin composition, but by using the assistant in combination with the phosphazen compound,

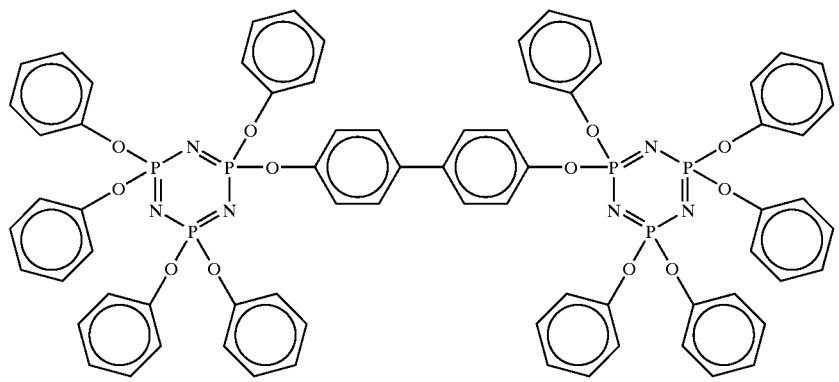

(16)

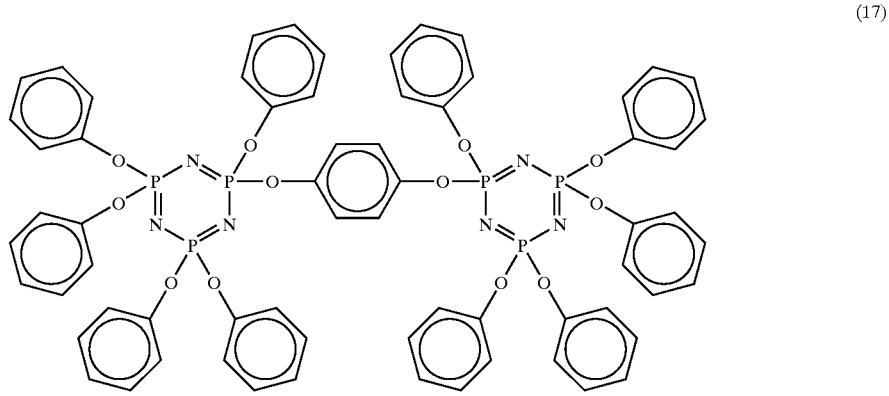

(17)

higher flame retardance can be obtained by addition of the assistant in a small amount due to the synergistic effect of them.

As the flame retarding assistants, there may be used at least one metal compound selected from metal hydroxides, zinc borate, zinc molybdate and metal complexes.

As the metal hydroxide, aluminum hydroxide, magnesium hydroxide and a metal hydroxide solid solution represented by the following formula (10) have the effect to improve flame retardance with addition of them in a small amount due to the synergistic effect with the phosphazene compounds, and they are especially effective for this purpose.

$$Mg_{1-x}M_x(OH)_2 \qquad (10)$$

wherein M denotes at least one divalent metal selected from the group consisting of Mn, Fe, Co, Ni, Cu and Zn, and x denotes a number which satisfies the inequality $0.01 \leq x \leq 0.5$.

The flame retarding mechanism of these metal hydroxides is such that the metal hydroxides begin dehydration at the time of burning to absorb heat, thereby hindering the burning reaction. Furthermore, it is known that they accelerate carbonization of the cured resin, and it is considered that a flame retarding layer which intercepts oxygen is formed on the surface of the cured product.

Furthermore, these metal hydroxides have the effects to properly lower the heat absorption starting temperature and improve the flame retarding performance. If the heat absorption starting temperature is too low, moldability and reliability are adversely affected, and if the heat absorption starting temperature is higher than the decomposition temperature of the resin, flame retardance deteriorates, and the heat absorption starting temperature of the metal hydroxides of the present invention is suitably 250–350° C. Especially preferred $M^{2+}$ of the metal hydroxide solid solution represented by the formula (10) is $Ni^{2+}$ and $Zn^{2+}$.

Amount of the metal hydroxides of the present invention is preferably 1–15% by weight, more preferably 1–10% by weight in the total epoxy resin composition. If the amount is less than 1% by weight, flame retardance is insufficient, and if it exceeds 15% by weight, solder cracking resistance and moldability are deteriorated. Average particle diameter of the metal hydroxides of the present invention is preferably 0.5–30 μm, more preferably 0.5–10 μm.

As zinc borate, mention may be made of $2ZnO.3B_2O_3.3.5H_2O$, $4ZnO.B_2O_3.H_2O$, etc. in view of the balancing between flame retardance and reliability for moisture resistance, and especially, $2ZnO.3B_2O_3.3.5H_2O$ shows high flame retardance. Amount of zinc borate is preferably 1–20% by weight, more preferably 1–10% by weight in the total epoxy resin composition. If the amount is less than 1% by weight, flame retardance is insufficient, and if it exceeds 20% by weight, reliability for moisture resistance and moldability are deteriorated. Average particle diameter is preferably 1–30 μm, more preferably 2–20 μm.

It is considered that zinc molybdate accelerates carbonization of the cured resin when burning occurs, to cause interception of oxygen in the air, whereby burning is stopped and flame retardation is attained. Zinc molybdate may be used singly, but tends to easily absorb water, and when the amount thereof increases, water absorption of semiconductor devices increases, which might cause deterioration of reliability for moisture resistance and, furthermore, deterioration of moldability.

In order to reduce the water absorption rate, it is preferred to use inorganic materials such as transition metals, clay, zinc oxide, calcium carbonate, aluminum nitride, aluminum silicate, magnesium silicate, the above-mentioned inorganic fillers (fused silica, crystalline silica, talc, alumina, silicon nitride, etc.), and the like which are covered with zinc molybdate. As core materials, said inorganic fillers are preferred, and fused spherical silica or talc is most preferred from the points of handleability and cost. By covering the core material, only zinc molybdate on the surface acts as a flame-retarding agent, and since addition of zinc molybdate in a large amount is not needed, increase of water absorption rate can be inhibited and moldability can be improved.

Covering amount of zinc molybdate is preferably 5–40% by weight based on the weight of the core material. Average particle diameter of the core material covered with zinc molybdate is preferably 0.5–30 μm, and the maximum particle diameter is preferably not more than 75 μm.

Amount of zinc molybdate is preferably 0.05–5% by weight, more preferably 0.1–3% by weight in the total epoxy resin composition. If the amount is less than 0.05% by weight, flame retardance cannot be obtained, and if it exceeds 5% by weight, ionic impurities in the epoxy resin composition increase, reliability for moisture resistance in pressure cooker test and the like is deteriorated, and moldability is also deteriorated.

The flame retarding assistant comprising a core material covered with zinc molybdate can be obained, for example, in the following manner. Molybdenum oxide and a core material (fused spherical silica, talc or the like) are mixed with water to prepare a slurry. This slurry is heated to 70° C., and slowly mixed with a slurry of zinc oxide, followed by stirring the mixture for about 1 hour. A solid material is taken by filtration and water is removed at 110° C., and then the solid material is ground. Then, the ground product is fired at 550° C. for 8 hours to obtain the desired flame retarding assistant.

The metal complexes used in the present invention act as flame-retarding agents, and flame retarding effect can be obtained with addition of them in a small amount. The metal complexes of the present invention are those which are formed by coordinating a ligand selected from naphthenic acid, acetylacetonato, phthalocyanine and thiocyanic acid with a metal element selected from the group consisting of Co, Cu, Zn, Ni, Mn and Fe, and examples of the metal complexes are cobalt naphthenate, cobalt acetylacetonato, copper acetylacetonato, zinc acetylacetonato, etc. These may be used each alone or in admixture.

Among them, cobalt naphthenate is preferred because it has especially high flame retarding performance and furthermore the amount of it can be reduced.

The flame retarding mechanism of the metal complexes of the present invention is considered to be the effect of inhibiting the generation of combustible volatile components at burning and the effect of accelerating the carbonization of the cured resin to form a flame retarding layer which intercepts oxygen on the surface of the cured product.

Amount of the metal complexes of the present invention is preferably 0.001–10% by weight, more preferably 0.01–5% by weight in the total epoxy resin composition. If the amount is less than 0.001% by weight, flame retardance is insufficient, and if it exceeds 10% by weight, curability is deteriorated.

Use of an organopolysiloxane represented by the formula (11) as a flame-retarding agent is also effective in view of the synergistic effect with the phosphazene compound.

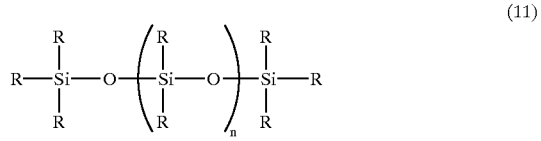

(11)

R's in the organopolysiloxane represented by the formula (11) are monovalent organic groups, and 30–100% by weight of all the organic groups are phenyl groups and the remaining organic groups are at least one group selected from the group consisting of vinyl group-substituted organic groups, alkylalkoxy groups of 1–6 carbon atoms, alkyl groups of 1–6 carbon atoms, amino group-substituted organic groups, epoxy group-substituted organic groups, hydroxyl group-substituted organic groups and mercapto group-substituted organic groups. This organopolysiloxane is a liquid compound of low molecular weight.

When siloxane skeleton has phenyl groups, vinyl group-substituted organic groups or alkylalkoxy groups of 1–6 carbon atoms, the organopolysiloxane can readily dissolve in the resin and can plasticize the resin, and, as a result, the epoxy resin composition can be readily adhered to various metals and adhesion can be improved. Moreover, 30–100% by weight of the total organic groups are phenyl groups, and these phenyl groups contribute to improvement of flame retardance.

In the case of polydimethylsiloxane conventionally used in epoxy resin compositions for encapsulating semiconductors, a polyalkylene oxide component is introduced for giving compatibility with the resin. This polyalkylene oxide component is inferior in water resistance owing to its hydrophilic group, and semiconductor devices encapsulated with an epoxy resin composition containing the organopolysiloxane wherein the component is introduced, are high in water absorption and tend to deteriorate in solder cracking resistance. However, the organopolysiloxane represented by the formula (11) used in the present invention contains no polyalkylene oxide, and, hence, causes no problem of increase of water absorption rate.

It is essential that R's in the organopolysiloxane represented by the formula (11) are monovalent organic groups, and that 30–100% by weight of all the organic groups are phenyl groups. If the amount is less than 30% by weight, there is the possibility of deterioration in compatibility with the resin, contribution to improvement of flame retardance and high-temperature storage characteristics.

Furthermore, polymerization degree of the organopolysiloxane represented by the formula (11) in the present invention (the value n in the formula (11)) is preferably 5–100. If the value n as an average value is less than 5, vapor pressure at high temperatures increases and the organopolysiloxane is evaporated at the molding temperature of the epoxy resin composition and does not remain in the semiconductor device, and if it exceeds 100, melt viscosity of the epoxy resin composition increases to cause deterioration of moldability.

The remaining organic groups other than phenyl group are preferably at least one group selected from vinyl group-substituted organic groups and alkylalkoxy groups of 1–6 carbon atoms, and amount of these groups is preferably not more than 50% by weight of all the organic groups. If it exceeds 50% by weight, content of the phenyl group decreases and there is the possibility of deterioration in flame retardance. From the point of improvement in flame retardance, preferred are vinyl group-substituted organic groups which accelerate radical reaction at burning and alkylalkoxy groups of 1–6 carbon atoms which chemically react with silica at burning.

In the present invention, particularly, from the viewpoints of reliability for moisture resistance and inhibition of deterioration in adhesion between a lead frame and the epoxy resin composition, it is effective to add ion scavengers which scavenge phosphate ion and phosphite ion generated from the phosphazene compounds and fix these ions.

As the ion scavengers, preferred are at least one compound selected from hydrotalcite compounds of the formula (12), Bi-based metal compounds of the formula (13) and zinc oxide.

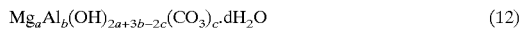

(12)

wherein $0<b/a\leq1$, $0\leq c/b<1.5$, and d is 0 or a positive integer.

(13)

wherein a=0.9–1.1, b=0.6–0.8, c+d=0.2–0.4, and d/c=0–2.0.

Amount of the ion scavengers is preferably 0.01–1% by weight, more preferably 0.1–0.9% by weight in the total epoxy resin composition. If the amount is less than 0.01% by weight, phosphate ion and phosphite ion cannot be scavenged, and, hence, reliability for moisture resistance is not sufficiently improved. If it exceeds 1% by weight, there occurs deterioration of curability and adhesion to cause reduction in soldering resistance.

The epoxy resin composition of the present invention contains the components (A)–(E) as essential components and, optionally, a flame retarding assistant and an ion scavenger, and it may additionally contain various additives, e.g., silane coupling agents, coloring agents such as carbon black, releasing agents such as natural wax and synthetic wax, and low-stress additives such as silicone oil and rubbers, and the like.

The epoxy resin composition of the present invention can be obtained by mixing components (A)–(E) and other additives sufficiently uniformly by use of a mixer or the like, and furthermore melt-kneading the mixture by hot-rollers, a kneader or the like, and then cooling and grinding it.

For encapsulating various electronic parts such as semiconductor elements using the epoxy resin composition of the present invention, curing and molding can be carried out by conventional molding methods such as transfer molding, compression molding, injection molding, and the like. Semiconductor devices can be made using the epoxy resin composition of the present invention by known methods.

BEST MODE FOR CARRYING OUT THE INVENTION

The present invention will be explained specifically by the following examples, which should not be construed as limiting the invention in any manner. The mixing proportions of the components are parts by weight.

EXAMPLE 1

Epoxy resin 1 mainly composed of the structure of the formula (18) (melting point: 105° C., epoxy equivalent: 191 g/eq.) — 5.6 parts by weight $$CH_2-CH-CH_2O-\underset{CH_3}{\underset{|}{\overset{CH_3}{\overset{|}{\bigcirc}}}}-\underset{CH_3}{\underset{|}{\overset{CH_3}{\overset{|}{\bigcirc}}}}-O-CH_2-CH-CH_2 \quad (18)$$

Phenolic resin 1 representing by the formula (19) (softening point: 77° C., hydroxyl equivalent: 174 g/eq.) — 4.9 parts by weight $$\left(\underset{OH}{\bigcirc}-CH_2-\bigcirc-CH_2-\underset{OH}{\bigcirc}\right)_n H \quad (19)$$

Phosphazene compound 1 represented by the formula (20) — 0.5 part by weight

(20) [cyclic phosphazene structure with six phenoxy groups on P₃N₃ ring]

Fused spherical silica (average particle diameter: 20 μm) — 88.0 parts by weight
Triphenylphoshine — 0.2 part by weight
Epoxysilane (γ-glycidoxypropyltrimethoxysilane) — 0.2 part by weight
Carbon black — 0.3 part by weight
Carnauba wax — 0.3 part by weight The above enumerated components were mixed at room temperature using a mixer and then kneaded using a twin roll of 90° C. and 45° C. in surface temperature, followed by cooling and then grinding to obtain an epoxy resin composition. The resulting epoxy resin composition was evaluated by the following methods. The results are shown in Table 1.

Evaluation Methods

Spiral flow: This was measured using a mold for measurement of spiral flow in accordance with EMMI-1–66 at a mold temperature of 175° C., under an injection pressure of 6.9 MPa and for a curing time of 120 seconds. The unit of the value obtained is cm.

Curability: Molding was carried out using a low-pressure transfer molding machine at a mold temperature of 175° C., under an injection pressure of 6.9 MPa and for a curing time of 120 seconds. Surface hardness of the runner after 10 seconds from opening of the mold was measured by Barcol hardness tester #935. The Barcol hardness is an indication for curability, and the larger value means better curability.

Moisture absorption rate: A disk of 50 mm in diameter and 3 mm in thickness was molded using a low-pressure transfer molding machine at a mold temperature of 175° C., under an injection pressure of 6.9 MPa and for a curing time of 120 seconds. The resulting molded product was subjected to post-curing at 175° C. for 8 hours. The cured product was left to stand for 168 hours in the environment of 85° C. and a relative humidity of 85%, and change in weight was measured, and moisture absorption rate was obtained. The unit is % by weight.

Hot flexural strength: Flexural strength was measured in accordance with JIS K 6911 at 240° C. The unit is $N/mm^2$.

Flame retardance: Test pieces (127 mm×12.7 mm with three kinds of thicknesses of 1.0 mm, 1.6 mm and 3.2 mm) were molded using a low-pressure transfer molding machine at a mold temperature of 175° C., under an injection pressure of 6.9 MPa and for a curing time of 120 seconds, followed by subjecting to post-curing at 175° C. for 8 hours. Thereafter, ΣF, Fmax were measured in accordance with UL-94 vertical method, and flame retardance was judged.

Contents of phosphoric acid and phosphorous acid in phosphazene compounds: One gram of a phosphazene compound and 20 g of pure water were weighed and charged in a pressure vessel, which was then closed, followed by treating at 125° C. for 120 hours. Then, amounts of phosphate ion and phosphite ion extracted into pure water were measured by a capillary electrophoresis device as concentrations of phosphate ion and phosphite ion, respectively. Contents of phosphate ion and phosphite ion per unit weight of the phosphazene compound were calculated. The unit is ppm.

Contents of phosphoric acid and phosphorous acid in the epoxy resin composition: The above test piece for evaluation of flame retardance was subjected to post-curing at 175° C. for 8 hours and pulverized to 100 mesh or less by a grinding machine. The pulverized cured product was subjected to extraction with pure water using a pressure cooker (120° C., 20 hours). As for the resulting extraction water, concentrations of phosphate ion and phosphite ion were respectively measured by a capillary electrophoresis device. Contents of phosphate ion and phosphite ion per unit weight of the cured product of the epoxy resin composition were calculated. The unit is ppm.

Reliability for moisture resistance: A 16pSOP (using TEG3 of imitation element with wiring width of 20 μm) was molded using a low-pressure transfer molding machine at a mold temperature of 175° C., under an injection pressure of 6.9 MPa and for a curing time of 120 seconds, and subjected to post-curing at 175° C. for 8 hours, and, thereafter, to evaluation of reliability for moisture resistance (treating the cured product by applying a voltage of 10 V at 140° C./relative humidity 85%), and failure of opening between wires was examined. Among 15 packages, the number of defective packages after lapse of 500 hours and 1000 hours from the treatment was shown in percentage as defective fraction. The unit is %.

Solder resistance: A 80pQFP (2 mm in thickness, chip size: 9.0 mm×9.0 mm) was molded using a low-pressure transfer molding machine at a mold temperature of 175° C., under an injection pressure of 6.9 MPa and for a curing time of 120 seconds, followed by subjecting to post-curing at 175° C. for 8 hours. The cured product was left to stand for 168 hours at 85° C. and a relative humidity of 85%, and then dipped in a solder tank at 240° C. for 10 seconds. The product was observed with a microscope, and crack generation rate [(crack generation rate)={(the number of packages where external cracks were generated)/(the total number of packages)}×100] was obtained. The unit is %. Moreover, delamination area at the interface between the semiconductor element and the cured product of the epoxy resin composition was measured using a scanning acoustic tomograph, and delamination rate [(delamination rate)={(delamination area)/(area of semiconductor element)}×100] was obtained. The unit is %.

High-temperature storage characteristics: A 16pDIP (chip size: 3.0 mm×3.5 mm) was molded using a low-pressure transfer molding machine at a mold temperature of 175° C., under an injection pressure of 6.9 MPa and for a curing time of 120 seconds, followed by subjecting to post-curing at 175° C. for 8 hours. The cured product was subjected to a high-temperature storage test (185° C., 1000 hours), and a package in which the electrical resistance between wires increased 20% from the initial value was judged to be defective. The rate of the number of defective packages in 15 packages (defective fraction) was shown by percentage. The unit is %.

EXAMPLES 2–5 AND COMPARATIVE EXAMPLES 1 AND 2

Epoxy resin compositions were produced in the same manner as in Example 1 using phosphazene compounds 2–5 in place of the phosphazene compound 1 in Example 1 in accordance with the formulation as shown in Table 1, and the resulting epoxy resin compositions were evaluated in the same manner as in Example 1. The results are shown in Table 1.

The phosphazene compounds 2–5 used in Examples 2–5 are as follows:

Phosphazene compound 2:

A phsphazene compound represented by the formula (21) where R consists of R1 and R2, and the ratio R1/R2=4/1, Phosphazene compound 3:

A phsphazene compound represented by the formula (21) where R consists of R1 and R3, and the ratio R1/R3=5/1, Phosphazene compound 4:

A phsphazene compound represented by the formula (17), and

Phosphazene compound 5:

A phsphazene compound represented by the formula (22) which is a mixture of n=1–50 with an average value of 18.

Furthermore, the brominated bisphenol A type epoxy resin used in Comparative Example 2 had an epoxy equivalent of 365 g/eq. and a content of bromine atom of 48% by weight.

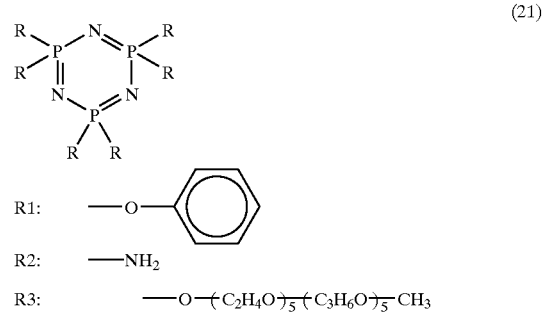

(21)

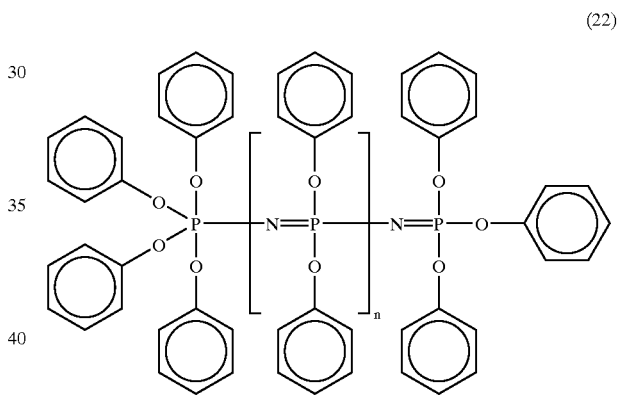

(22)

EXAMPLES 6–10 AND COMPARATIVE EXAMPLES 3–6

Epoxy resin compositions were produced in the same manner as in Example 1 with changing the epoxy resin and the phenolic resin in Example 1 to those as shown in Table 2, and the resulting epoxy resin compositions were evaluated in the same manner as in Example 1. The results are shown in Table 2.

The epoxy resins 2–5 and the phenolic resins 2–3 used in Examples 6–10 and Comparative Examples 3–6 are shown by the formulas (23)–(28).

Epoxy resin 2:

An epoxy resin shown by the formula (23) having a softening point of 60° C. and an epoxy equivalent of 270 g/eq.

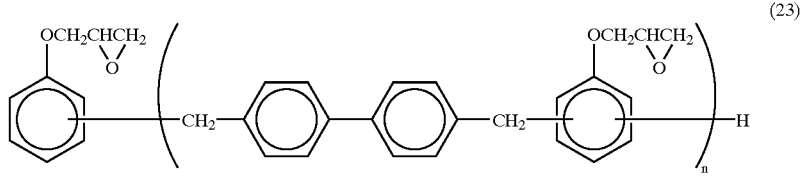
(23)

Epoxy resin 3:

An epoxy resin shown by the formula (24) having a softening point of 81° C. and an epoxy equivalent of 265 g/eq.

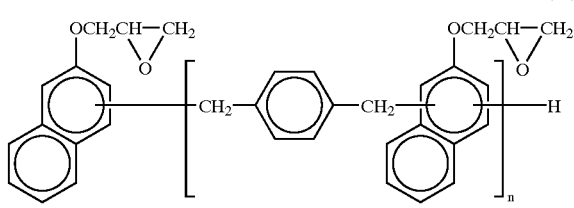
(24)

Epoxy resin 4:

An epoxy resin shown by the formula (25) having a softening point of 62° C. and an epoxy equivalent of 227 g/eq.

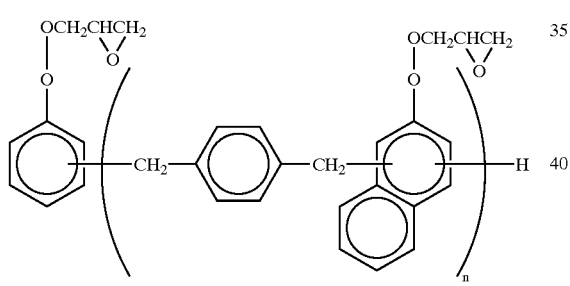
(25)

Epoxy resin 5:

An epoxy resin shown by the formula (26) having a softening point of 73° C. and an epoxy equivalent of 269 g/eq.

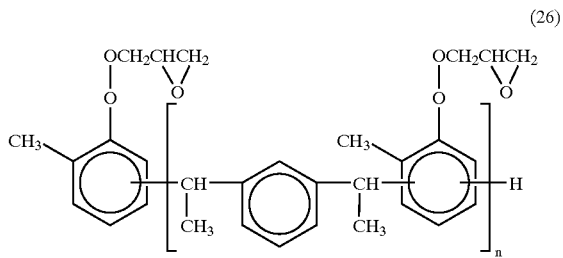
(26)

Phenolic resin 2:

A phenolic resin shown by the formula (27) having a softening point of 73° C. and a hydroxyl equivalent of 199 g/eq.

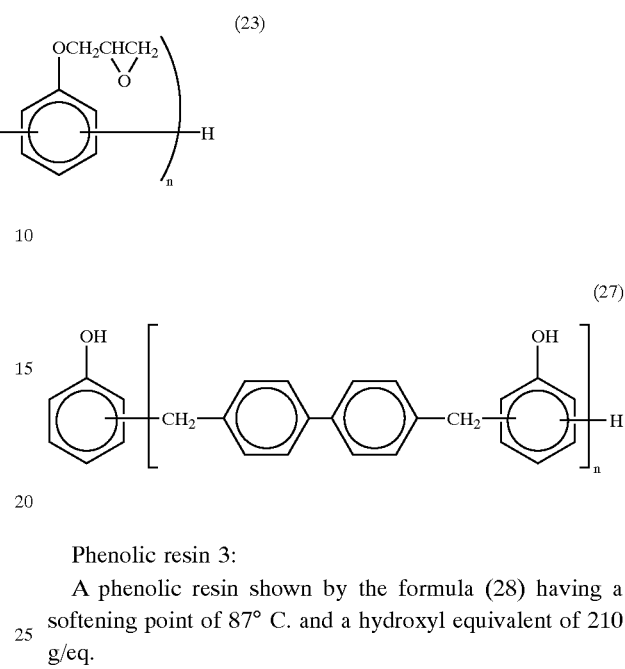
(27)

Phenolic resin 3:

A phenolic resin shown by the formula (28) having a softening point of 87° C. and a hydroxyl equivalent of 210 g/eq.

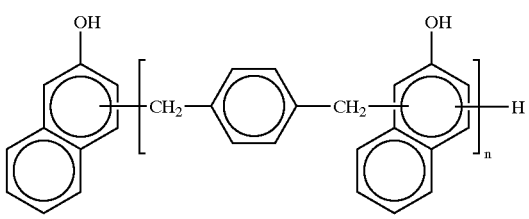
(28)

EXAMPLES 11–21 AND COMPARATIVE EXAMPLES 7–17

Epoxy resin compositions were produced in the same manner as in Example 1 with changing the epoxy resin 1 and the phenolic resin 1 in Example 1 to epoxy resin 6 and phenolic resin 4, respectively, and further adding flame retarding assistants as shown in Tables 3 and 4, and the resulting epoxy resin compositions were evaluated in the same manner as in Example 1. However, regarding the evaluation of the solder resistance, the moisture absorbing conditions of leaving for 168 hours at 85° C. and a relative humidity of 85% in Example 1 were changed to leaving for 168 hours at 85° C. and a relative humidity of 60%. The results are shown in Tables 3 and 4.

The epoxy resin 6 and the phenolic resin 4 used in Examples 11–21 and Comparative Examples 7–17 are shown below.

Epoxy resin 6:

An epoxy resin shown by the formula (29) having a softening point of 58° C. and an epoxy equivalent of 244 g/eq.

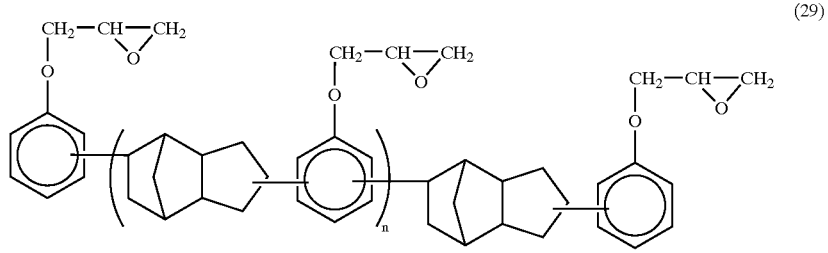

(29)

Phenolic resin 4:

A phenol novolak resin having a softening point of 75° C. and a hydroxyl equivalent of 103 g/eq.

The organopolysiloxanes 1 and 2 used in Examples 20 and 21 are shown by the formulas (30) and (31).

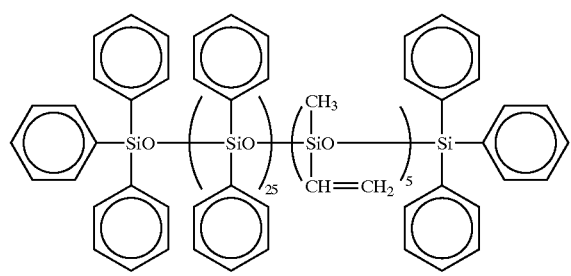

(30)

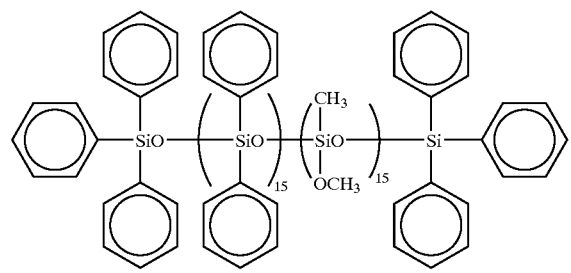

(31)

EXAMPLES 22–26 AND COMPARATIVE EXAMPLES 18–19

Epoxy resin compositions were produced in the same manner as in Example 1 using the phosphazene compound 1 containing phosphate ion and phosphite ion as shown in Table 5 and further adding the ion scavengers as shown in Table 5, and the resulting epoxy resin compositions were evaluated in the same manner as in Example 1. The results are shown in Table 5.

As clear from Tables 1–5, according to the present invention, there are obtained epoxy resin compositions for encapsulation of semiconductors containing substantially neither halogen-based flame-retarding agents nor antimony compounds and excellent in moldability. Semiconductor devices made using these epoxy resin compositions are excellent in flame retardance, high-temperature storage characteristics, reliability for moisture resistance, and solder cracking resistance.

TABLE 1

|  | Examples | | | | | Comparative Examples | |
|---|---|---|---|---|---|---|---|
|  | 1 | 2 | 3 | 4 | 5 | 1 | 2 |
| Epoxy resin 1 | 5.6 | 5.6 | 5.5 | 5.6 | 5.3 | 5.8 | 4.3 |
| Phenolic resin 1 | 4.9 | 5.0 | 4.9 | 4.9 | 4.7 | 5.2 | 4.7 |
| Fused spherical silica | 88.0 | 88.0 | 88.0 | 88.0 | 88.0 | 88.0 | 87.0 |
| Phosphazene compound 1 | 0.5 | | | | | | |
| Phosphazene compound 2 | | 0.4 | | | | | |
| Phosphazene compound 3 | | | 0.6 | | | | |
| Phosphazene compound 4 | | | | 0.5 | | | |
| Phosphazene compound 5 | | | | | 1.0 | | |
| Brominated bisphenol A type epoxy resin | | | | | | | 2.0 |
| Antimony trioxide | | | | | | | 1.0 |
| Triphenylphosphine | 0.2 | 0.2 | 0.2 | 0.2 | 0.2 | 0.2 | 0.2 |
| Epoxysilane | 0.2 | 0.2 | 0.2 | 0.2 | 0.2 | 0.2 | 0.2 |
| Carbon black | 0.3 | 0.3 | 0.3 | 0.3 | 0.3 | 0.3 | 0.3 |
| Carnauba wax | 0.3 | 0.3 | 0.3 | 0.3 | 0.3 | 0.3 | 0.3 |

TABLE 1-continued

|  | Examples | | | | | Comparative Examples | |
| --- | --- | --- | --- | --- | --- | --- | --- |
|  | 1 | 2 | 3 | 4 | 5 | 1 | 2 |
| Spiral flow (cm) | 105 | 96 | 112 | 98 | 90 | 95 | 88 |
| Curability | 85 | 88 | 84 | 85 | 83 | 86 | 86 |
| Moisture absorption rate (wt %) | 0.23 | 0.24 | 0.25 | 0.23 | 0.25 | 0.22 | 0.22 |
| Hot flexural strength (N/mm$^2$) | 2.4 | 2.9 | 2.3 | 2.4 | 2.2 | 2.5 | 2.5 |
| Flame retardance | | | | | | | |
| 1.0 mm | V-0 | V-0 | V-0 | V-0 | V-0 | Completely burnt | V-0 |
| 1.6 mm | V-0 | V-0 | V-0 | V-0 | V-0 | Completely burnt | V-0 |
| 3.2 mm | V-0 | V-0 | V-0 | V-0 | V-0 | Completely burnt | V-0 |
| Contents of phosphoric acid and phosphorous acid in phosphazene compound (ppm) | 35 | 44 | 31 | 32 | 86 | No | No |
| Contents of phosphoric acid and phosphorous acid in epoxy resin composition (ppm) | 0.1 | 0.1 | 0.1 | 0.1 | 0.2 | No | No |
| Reliability for moisutre resistance | | | | | | | |
| 500 hr (%) | 0 | 0 | 0 | 0 | 0 | 0 | 0 |
| 1000 hr (%) | 0 | 0 | 0 | 0 | 0 | 0 | 20 |
| Solder resistance | | | | | | | |
| Crack generation rate (%) | 0 | 0 | 0 | 0 | 0 | 0 | 0 |
| Delamination rate (%) | 0 | 0 | 0 | 0 | 0 | 0 | 0 |
| High-temperature storage characteristics (%) | 0 | 0 | 0 | 0 | 0 | 0 | 100 |

TABLE 2

|  | Examples | | | | | Comparative Examples | | | |
| --- | --- | --- | --- | --- | --- | --- | --- | --- | --- |
|  | 6 | 7 | 8 | 9 | 10 | 3 | 4 | 5 | 6 |
| Epoxy resin 2 | 7.6 | 7.3 | | | | 7.5 | | | |
| Epoxy resin 3 | | | 6.2 | | | | 7.3 | | |
| Epoxy resin 4 | | | | 6.8 | | | | 7.4 | |
| Epoxy resin 5 | | | | | 7.3 | | | | 7.9 |
| Phenolic resin 1 | 4.9 | | | 5.2 | 4.7 | | | 5.6 | 5.1 |
| Phenolic resin 2 | | 5.4 | | | | 5.5 | | | |
| Phenolic resin 3 | | | 6.3 | | | | 5.7 | | |
| Fused spherical silica | 86.0 | 86.0 | 86.0 | 86.0 | 86.0 | 86.0 | 86.0 | 86.0 | 86.0 |
| Phosphazene compound 1 | 0.5 | 0.3 | 0.5 | 1.0 | 1.0 | | | | |
| Triphenylphosphine | 0.2 | 0.2 | 0.2 | 0.2 | 0.2 | 0.2 | 0.2 | 0.2 | 0.2 |
| Epoxysilane | 0.2 | 0.2 | 0.2 | 0.2 | 0.2 | 0.2 | 0.2 | 0.2 | 0.2 |
| Carbon black | 0.3 | 0.3 | 0.3 | 0.3 | 0.3 | 0.3 | 0.3 | 0.3 | 0.3 |
| Carnauba wax | 0.3 | 0.3 | 0.3 | 0.3 | 0.3 | 0.3 | 0.3 | 0.3 | 0.3 |
| Spiral flow (cm) | 91 | 82 | 76 | 86 | 83 | 95 | 88 | 88 | 88 |
| Curability | 85 | 81 | 88 | 87 | 83 | 83 | 86 | 89 | 86 |
| Moisture absorption rate (wt %) | 0.20 | 0.18 | 0.17 | 0.23 | 0.25 | 0.18 | 0.16 | 0.22 | 0.23 |
| Hot flexural strength (N/mm$^2$) | 2.5 | 2.1 | 2.9 | 2.6 | 2.2 | 2.3 | 3.0 | 2.8 | 2.5 |
| Flame retardance | | | | | | | | | |
| 1.0 mm | V-0 | V-0 | V-0 | V-0 | V-0 | V-1 | Completely burnt | Completely burnt | Completely burnt |
| 1.6 mm | V-0 | V-0 | V-0 | V-0 | V-0 | V-0 | V-1 | Completely burnt | Completely burnt |
| 3.2 mm | V-0 | V-0 | V-0 | V-0 | V-0 | V-0 | V-0 | V-1 | V-1 |
| Contents of phosphoric acid and phosphorous acid in phosphazene compound (ppm) | 35 | 35 | 35 | 35 | 35 | No | No | No | No |
| Contents of phosphoric acid and phosphorous acid in epoxy resin composition (ppm) | 0.1 | 0.1 | 0.1 | 0.1 | 0.1 | No | No | No | No |
| Reliability for moisutre resistance | | | | | | | | | |
| 500 hr (%) | 0 | 0 | 0 | 0 | 0 | 0 | 0 | 0 | 0 |
| 1000 hr (%) | 0 | 0 | 0 | 0 | 0 | 0 | 0 | 0 | 0 |
| Solder resistance | | | | | | | | | |
| Crack generation rate (%) | 0 | 0 | 0 | 0 | 0 | 0 | 0 | 0 | 0 |
| Delamination rate (%) | 0 | 0 | 0 | 0 | 0 | 0 | 0 | 0 | 0 |

TABLE 2-continued

|  | Examples | | | | | Comparative Examples | | | |
| --- | --- | --- | --- | --- | --- | --- | --- | --- | --- |
|  | 6 | 7 | 8 | 9 | 10 | 3 | 4 | 5 | 6 |
| High-temperature storage characteristics (%) | 0 | 0 | 0 | 0 | 0 | 0 | 0 | 0 | 0 |

TABLE 3

|  | Examples | | | | | | | | | | |
| --- | --- | --- | --- | --- | --- | --- | --- | --- | --- | --- | --- |
|  | 11 | 12 | 13 | 14 | 15 | 16 | 17 | 18 | 19 | 20 | 21 |
| Epoxy resin 6 | 7.9 | 8.9 | 8.9 | 8.9 | 8.9 | 8.9 | 8.8 | 8.5 | 8.5 | 8.5 | 8.5 |
| Phenolic resin 4 | 4.1 | 4.6 | 4.6 | 4.6 | 4.6 | 4.6 | 4.7 | 4.5 | 4.5 | 4.5 | 4.5 |
| Fused spherical silica | 85.0 | 80.0 | 80.0 | 80.0 | 80.0 | 80.0 | 83.0 | 85.0 | 85.0 | 85.0 | 85.0 |
| Phosphazene compound 1 | 2.0 | 0.5 | 0.5 | 0.5 | 0.5 | 0.5 | 0.5 | 0.5 | 0.5 | 0.5 | 0.5 |
| Aluminum hydroxide (Average particle diameter 5 μm) |  | 5.0 |  |  |  |  |  |  |  |  |  |
| Magnesium hydroxide (Average particle diameter 3 μm) |  |  | 5.0 |  |  |  |  |  |  |  |  |
| $Mg_{0.8}Zn_{0.2}(OH)_2$ (Average particle diameter 2 μm) |  |  |  | 5.0 |  |  |  |  |  |  |  |
| $Mg_{0.7}Ni_{0.3}(OH)_2$ (Average particle diameter 1 μm) |  |  |  |  | 5.0 |  |  |  |  |  |  |
| $2ZnO.3B_2O_3.3.5H_2O$ (Average particle diameter 3 μm) |  |  |  |  |  | 5.0 |  |  |  |  |  |
| Zinc molybdate (Average particle diameter 1 μm) |  |  |  |  |  |  | 2.0 |  |  |  |  |
| Cobalt naphthenate |  |  |  |  |  |  |  | 5.0 |  |  |  |
| Copper acetylacetonato |  |  |  |  |  |  |  |  | 0.5 |  |  |
| Polyorganosiloxane 1 |  |  |  |  |  |  |  |  |  | 0.5 |  |
| Polyorganosiloxane 2 |  |  |  |  |  |  |  |  |  |  | 0.5 |
| Triphenylphosphine | 0.2 | 0.2 | 0.2 | 0.2 | 0.2 | 0.2 | 0.2 | 0.2 | 0.2 | 0.2 | 0.2 |
| Epoxysilane | 0.2 | 0.2 | 0.2 | 0.2 | 0.2 | 0.2 | 0.2 | 0.2 | 0.2 | 0.2 | 0.2 |
| Carbon black | 0.3 | 0.3 | 0.3 | 0.3 | 0.3 | 0.3 | 0.3 | 0.3 | 0.3 | 0.3 | 0.3 |
| Carnauba wax | 0.3 | 0.3 | 0.3 | 0.3 | 0.3 | 0.3 | 0.3 | 0.3 | 0.3 | 0.3 | 0.3 |
| Spiral flow (cm) | 89 | 81 | 80 | 85 | 83 | 88 | 87 | 86 | 90 | 84 | 85 |
| Curability | 83 | 88 | 88 | 85 | 87 | 85 | 84 | 85 | 84 | 86 | 84 |
| Moisture absorption rate (wt %) | 0.25 | 0.24 | 0.25 | 0.25 | 0.25 | 0.26 | 0.25 | 0.23 | 0.22 | 0.23 | 0.23 |
| Hot flexural strength (N/mm²) | 2.0 | 2.5 | 2.3 | 2.4 | 2.3 | 2.4 | 2.4 | 2.4 | 2.4 | 2.2 | 2.2 |
| Flame retardance |  |  |  |  |  |  |  |  |  |  |  |
| 1.0 mm | V-0 | V-0 | V-0 | V-0 | V-0 | V-0 | V-0 | V-0 | V-0 | V-0 | V-0 |
| 1.6 mm | V-0 | V-0 | V-0 | V-0 | V-0 | V-0 | V-0 | V-0 | V-0 | V-0 | V-0 |
| 3.2 mm | V-0 | V-0 | V-0 | V-0 | V-0 | V-0 | V-0 | V-0 | V-0 | V-0 | V-0 |
| Contents of phosphoric acid and phosphorous acid in phosphazene compound (ppm) | 35 | 35 | 35 | 35 | 35 | 35 | 35 | 35 | 35 | 35 | 35 |
| Contents of phosphoric acid and phosphorous acid in epoxy resin composition (ppm) | 0.8 | 0.1 | 0.1 | 0.1 | 0.1 | 0.1 | 0.1 | 0.1 | 0.1 | 0.1 | 0.1 |
| Reliability for moisutre resistance |  |  |  |  |  |  |  |  |  |  |  |
| 500 hr (%) | 0 | 0 | 0 | 0 | 0 | 0 | 0 | 0 | 0 | 0 | 0 |
| 1000 hr (%) | 0 | 0 | 0 | 0 | 0 | 0 | 0 | 0 | 0 | 0 | 0 |
| Solder resistance |  |  |  |  |  |  |  |  |  |  |  |
| Crack generation rate (%) | 20 | 0 | 0 | 0 | 0 | 0 | 0 | 0 | 0 | 0 | 0 |
| Delamination rate (%) | 0 | 0 | 0 | 0 | 0 | 0 | 0 | 0 | 0 | 0 | 0 |
| High-temperature storage characteristics (%) | 0 | 0 | 0 | 0 | 0 | 0 | 0 | 0 | 0 | 0 | 0 |

TABLE 4

| | Comparative Examples | | | | | | | | | | |
|---|---|---|---|---|---|---|---|---|---|---|---|
| | 7 | 8 | 9 | 10 | 11 | 12 | 13 | 14 | 15 | 16 | 17 |
| Epoxy resin 6 | 9.2 | 9.2 | 9.2 | 9.2 | 9.2 | 9.2 | 9.2 | 7.9 | 7.9 | 7.9 | 7.9 |
| Phenolic resin 4 | 4.8 | 4.8 | 4.8 | 4.8 | 4.8 | 4.8 | 4.8 | 4.1 | 4.1 | 4.1 | 4.1 |
| Fused spherical silica | 85.0 | 70.0 | 70.0 | 70.0 | 70.0 | 70.0 | 75.0 | 85.0 | 85.0 | 85.0 | 85.0 |
| Phosphazene compound 1 | | | | | | | | | | | |
| Aluminum hydroxide | | 15.0 | | | | | | | | | |
| Magnesium hydroxide | | | 15.0 | | | | | | | | |
| $Mg_{0.8}Zn_{0.2}(OH)_2$ | | | | 15.0 | | | | | | | |
| (Average particle diameter 3 μm) | | | | | | | | | | | |
| $Mg_{0.7}Ni_{0.3}(OH)_2$ | | | | | 15.0 | | | | | | |
| (Average particle diameter 1 μm) | | | | | | | | | | | |
| $2ZnO \cdot 3B_2O_3 \cdot 3.5H_2O$ | | | | | | 15.0 | | | | | |
| Zinc molybdate | | | | | | | 10.0 | | | | |
| (Average particle diameter 1 μm) | | | | | | | | | | | |
| Cobalt naphthenate | | | | | | | | 2.0 | | | |
| Copper acetylacetonato | | | | | | | | | 2.0 | | |
| Polyorganosiloxane 1 | | | | | | | | | | 2.0 | |
| Polyorganosiloxane 2 | | | | | | | | | | | 2.0 |
| Triphenylphosphine | 0.2 | 0.2 | 0.2 | 0.2 | 0.2 | 0.2 | 0.2 | 0.2 | 0.2 | 0.2 | 0.2 |
| Epoxysilane | 0.2 | 0.2 | 0.2 | 0.2 | 0.2 | 0.2 | 0.2 | 0.2 | 0.2 | 0.2 | 0.2 |
| Carbon black | 0.3 | 0.3 | 0.3 | 0.3 | 0.3 | 0.3 | 0.3 | 0.3 | 0.3 | 0.3 | 0.3 |
| Carnauba wax | 0.3 | 0.3 | 0.3 | 0.3 | 0.3 | 0.3 | 0.3 | 0.3 | 0.3 | 0.3 | 0.3 |
| Spiral flow (cm) | 84 | 63 | 58 | 65 | 62 | 95 | 101 | 88 | 90 | 77 | 80 |
| Curability | 88 | 67 | 71 | 69 | 66 | 35 | 40 | 75 | 56 | 70 | 75 |
| Moisture absorption rate (wt %) | 0.22 | 0.32 | 0.34 | 0.33 | 0.3 | 0.29 | 0.29 | 0.27 | 0.32 | 0.27 | 0.28 |
| Hot flexural strength (N/mm²) | 2.5 | 2.1 | 1.9 | 2.1 | 2.3 | 1.7 | 1.8 | 2.1 | 2 | 2.3 | 2.2 |
| Flame retardance | | | | | | | | | | | |
| 1.0 mm | Completely burnt | Completely burnt | Completely burnt | Completely burnt | Completely burnt | Completely burnt | Completely burnt | Completely burnt | Completely burnt | Completely burnt | Completely burnt |
| 1.6 mm | Completely burnt | V-1 | V-1 | V-1 | Completely burnt | Completely burnt | Completely burnt | Completely burnt | Completely burnt | Completely burnt | Completely burnt |

TABLE 4-continued

|  | Comparative Examples | | | | | | | | | | |
|---|---|---|---|---|---|---|---|---|---|---|---|
|  | 7 | 8 | 9 | 10 | 11 | 12 | 13 | 14 | 15 | 16 | 17 |
| 3.2 mm | Completely burnt | V-0 | V-0 | V-0 | V-1 | Completely burnt | V-1 | Completely burnt | V-1 | V-1 | Completely burnt |
| Reliability for moisture resistance | | | | | | | | | | | |
| 500 hr (%) | 0 | 0 | 14 | 20 | 20 | 0 | 0 | 40 | 20 | 0 | 0 |
| 1000 hr (%) | 0 | 20 | 60 | 80 | 33 | 40 | 20 | 100 | 40 | 0 | 0 |
| Solder resistance | | | | | | | | | | | |
| Crack generation rate (%) | 0 | 50 | 60 | 70 | 10 | 10 | 60 | 20 | 0 | 0 | 0 |
| Delamination rate (%) | 0 | 10 | 45 | 80 | 15 | 0 | 50 | 65 | 30 | 15 | 5 |
| High-temperature storage characteristics (%) | 0 | 0 | 0 | 20 | 0 | 0 | 0 | 40 | 0 | 0 | 0 |

TABLE 5

|  | Examples | | | | | Comparative Examples | |
| --- | --- | --- | --- | --- | --- | --- | --- |
|  | 22 | 23 | 24 | 25 | 26 | 18 | 19 |
| Epoxy resin 1 | 5.3 | 5.3 | 5.3 | 5.3 | 5.3 | 5.3 | 5.3 |
| Phenolic resin 1 | 4.7 | 4.7 | 4.7 | 4.7 | 4.7 | 4.7 | 4.7 |
| Fused spherical silica | 88.0 | 88.0 | 87.5 | 87.5 | 87.2 | 87.2 | 87.2 |
| Phosphazene compound 1 | 1.0 | 1.0 | 1.0 | 1.0 | 1.0 | 1.0 | 1.0 |
| $Mg_{4.3}Al_2(OH)_{12.6}CO_3 \cdot 3.5H_2O$ |  |  | 0.5 |  |  |  | 0.5 |
| $BiO_{1.0}(OH)_{0.7}(NO_3)_{0.2}(HSiO_3)_{0.1}$ |  |  |  | 0.5 |  |  |  |
| Zinc oxide |  |  |  |  | 0.8 | 0.8 | 0.8 |
| Triphenylphosphine | 0.2 | 0.2 | 0.2 | 0.2 | 0.2 | 0.2 | 0.2 |
| Epoxysilane | 0.2 | 0.2 | 0.2 | 0.2 | 0.2 | 0.2 | 0.2 |
| Carbon black | 0.3 | 0.3 | 0.3 | 0.3 | 0.3 | 0.3 | 0.3 |
| Carnauba wax | 0.3 | 0.3 | 0.3 | 0.3 | 0.3 | 0.3 | 0.3 |
| Spiral flow (cm) | 111 | 108 | 106 | 105 | 110 | 110 | 110 |
| Curability | 83 | 83 | 84 | 84 | 83 | 83 | 83 |
| Moisture absorption rate (wt %) | 0.23 | 0.23 | 0.23 | 0.23 | 0.23 | 0.23 | 0.23 |
| Hot flexural strength (N/mm$^2$) | 2.4 | 2.4 | 2.4 | 2.4 | 2.4 | 2.4 | 2.4 |
| Flame retardance |  |  |  |  |  |  |  |
| 1.0 mm | V-0 | V-0 | V-0 | V-0 | V-0 | V-0 | V-0 |
| 1.6 mm | V-0 | V-0 | V-0 | V-0 | V-0 | V-0 | V-0 |
| 3.2 mm | V-0 | V-0 | V-0 | V-0 | V-0 | V-0 | V-0 |
| Contents of phosphoric acid and phosphorous acid in phosphazene compound (ppm) | 120 | 400 | 400 | 400 | 400 | 640 | 1120 |
| Contents of phosphoric acid and phosphorous acid in epoxy resin composition (ppm) | 1.5 | 3.5 | 0.5 | 0.3 | 0.1 | 7.3 | 8.8 |
| Reliability for moisture resistance |  |  |  |  |  |  |  |
| 500 hr (%) | 0 | 0 | 0 | 0 | 0 | 60 | 80 |
| 1000 hr (%) | 0 | 10 | 0 | 0 | 0 | 100 | 100 |
| Solder resistance |  |  |  |  |  |  |  |
| Crack generation rate (%) | 0 | 0 | 0 | 0 | 0 | 10 | 20 |
| Delamination rate (%) | 0 | 0 | 0 | 0 | 0 | 30 | 50 |
| High-temperature storage characteristics (%) | 0 | 0 | 0 | 0 | 0 | 0 | 0 |

INDUSTRIAL APPLICABILITY

The epoxy resin composition of the present invention can be applied to encapsulation of various semiconductor elements. The semiconductor devices obtained by encapsulating with the resin composition of the present invention can be used for computers, liquid crystal display devices, portable telephones and the like.

What is claimed is:

1. An epoxy resin composition for encapsulating semiconductors, which comprises (A) an epoxy resin, (B) a phenolic resin, (C) a curing accelerator, (D) an inorganic filler and (E) a phosphazene compound as essential components, wherein the total weight of phosphate ion and phosphite ion contained in the phosphazene compound is not more than 500 ppm, the phosphazene compound has a melt viscosity of $0.7 \times 10^{-2}$ to $5 \times 10^{-2}$ Pa·s at 150° C., the phosphazene compound is a cyclic phosphazene compound represented by the following formula (1):

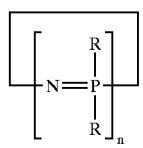

(1)

wherein n is an integer of 3–7, and R's denote same or different organic groups which are selected from the group consisting of alkyl groups, alkenyl groups, alkoxy groups, aryl groups, aryloxy groups, polyoxyalkylene groups, these groups in which at least one hydrogen atom is substituted with a group having an N, S, O or F atom, amino groups, fluoroalkyl groups and fluoroalkyloxy groups, and herein at least one of 2n R's in the cyclic phosphazene compound represented by the formula (1) are phenoxy groups.

2. An epoxy resin composition for encapsulating semiconductors, which comprises (A) an epoxy resin, (B) a phenolic resin, (C) a curing accelerator, (D) an inorganic filler and (E) a phosphazene compound as essential components, wherein the total weight of phosphate ion and phosphite ion contained in the phosphazene compound is not more than 500 ppm, the phosphazene compound has a melt viscosity of $0.7 \times 10^{-2}$ to $5 \times 10^{-2}$ Pa·s at 150° C., the phosphazene compound is a cyclic phosphazene compound represented by the following formula (1):

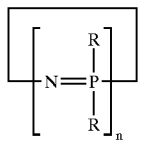
(1)

wherein n is an integer of 3–7, and R's denote same or different organic groups which are selected from the group consisting of alkyl groups, alkenyl groups, alkoxy groups, aryl groups, aryloxy groups, polyoxyalkylene groups, these groups in which at least one hydrogen atom is substituted with a group having an N, S, O or F atom, amino groups, fluoroalkyl groups and fluoroalkyloxy groups, and wherein at least one of 2n R's in the cyclic phosphazene compound represented by the formula (1) is an amino group.

3. An epoxy resin composition for encapsulating semiconductors, which comprises (A) an epoxy resin, (B) a phenolic resin, (C) a curing accelerator, (D) an inorganic filler and (E) a phosphazene compound as essential components, wherein the total weight of phosphate ion and phosphite ion contained in the phosphazene compound is not more than 500 ppm, the phosphazene compound has a melt viscosity of $0.7 \times 10^{-2}$ to $5 \times 10^{-2}$ Pa·s at 150° C., the phosphazene compound is a cyclic phosphazene compound represented by the following formula (1):

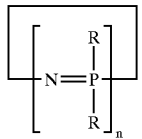
(1)

wherein n is an integer of 3–7, and R's denote same or different organic groups which are selected from the group consisting of alkyl groups, alkenyl groups, alkoxy groups, aryl groups, aryloxy groups, polyoxyalkylene groups, these groups in which at least one hydrogen atom is substituted with a group having an N, S, O or F atom, amino groups, fluoroalkyl groups and fluoroalkyloxy groups, and wherein at least one of 2n R's in the cyclic phosphazene compound represented by the formula (1) is a polyoxyalkylene group.

4. An epoxy resin composition for encapsulating semiconductors according to claim 1, 2 or 3 wherein the epoxy resin (A) is at least one resin selected from epoxy resins represented by the following formulas (2)–(6):

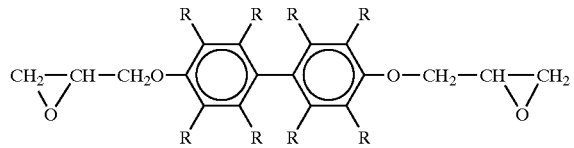
(2)

wherein R's denote hydrogen or an alkyl group of 1–4 carbon atoms and may be the same or different,

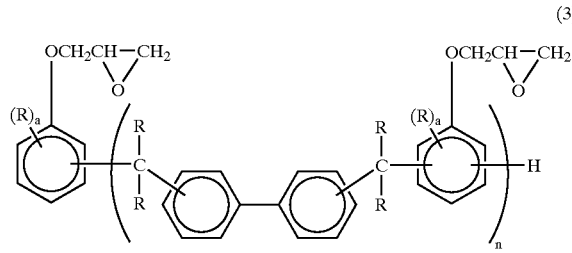
(3)

wherein R's denote hydrogen or an alkyl group of 1–4 carbon atoms and may be the same or different, a is 0 or a positive number of 1–4, and n is a positive number of 1–10 as an average value,

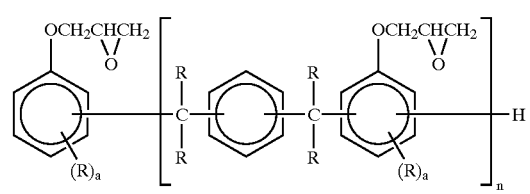
(4)

wherein R's denote hydrogen or an alkyl group of 1–4 carbon atoms and may be the same or different, a is 0 or a positive number of 1–4, and n is a positive number of 1–10 as an average value,

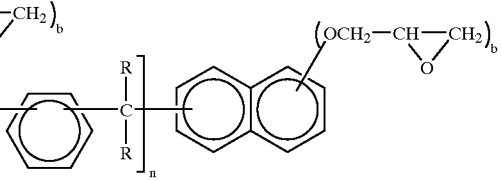
(5)

wherein R's denote an alkyl group of 1–4 carbon atoms and may be the same or different, b is 1 or 2, and n is 0 or a positive number of 1–10 as an average value, and

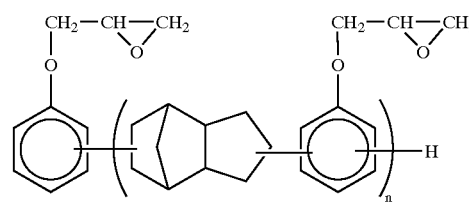
(6)

wherein n is a positive number of 1–10 as an average value.

5. An epoxy resin composition for encapsulating semiconductors according to claim 1, 2 or 3, wherein the phenolic resin (B) is at least one resin selected from phenolic resins represented by the following formulas (7)–(9):

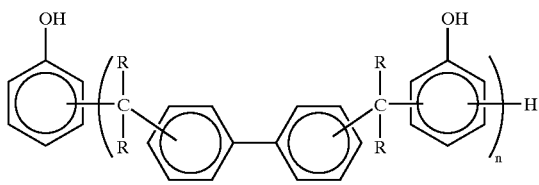
(7)

wherein R's denote hydrogen or an alkyl group of 1–4 carbon atoms and may be the same or different, and n is a positive number of 1–10 as an average value,

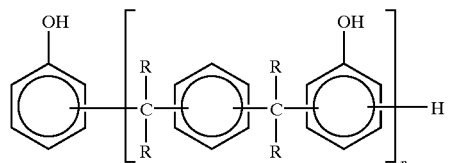
(8)

wherein R's denote hydrogen or an alkyl group of 1–4 carbon atoms and may be the same or different, and n is a positive number of 1–10 as an average value, and

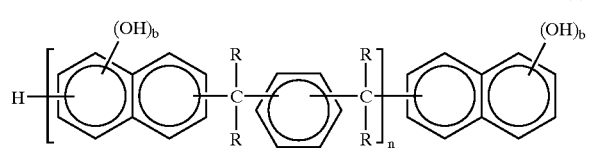
(9)

wherein R's denote an alkyl group of 1–4 carbon atoms and may be the same or different, b is 1 or 2, and n is 0 or a positive number of 1–10 as an average value.

6. An epoxy resin composition for encapsulating semiconductors according to claim 1, 2 or 3, which contain a flame-retarding assistant.

7. An epoxy resin composition for encapsulating semiconductors, according to claim 6, wherein the flame-retarding assistant is at least one metal compound selected from metal hydroxides, zinc borate, zinc molybdate and metal complexes.

8. An epoxy resin composition for encapsulating semiconductors according to claim 6, wherein the flame-retarding assistant is at least one compound selected from aluminum hydroxide, magnesium hydroxide and a metal hydroxide solid solution represented by the following formula (10):

$$Mg_{1-x}M_x(OH)_2 \quad (10)$$

wherein M denotes at least one divalent metal selected from the group consisting of Mn, Fe, Co, Ni, Cu and Zn, and x denotes a number of $0.01 \leq x \leq 0.5$.

9. An epoxy resin composition for encapsulating semiconductors according to claim 7, wherein the metal complex is a metal complex formed by coordinating a ligand selected from naphthenic acid, acetylacetonato, phthalocyanine and thiocyanic acid with a metal element selected from Co, Cu, Zn, Ni, Mn and Fe.

10. An epoxy resin composition for encapsulating semiconductors according to claim 6, wherein the flame-retarding assistant is a polyorganosiloxane represented by the following formula (11):

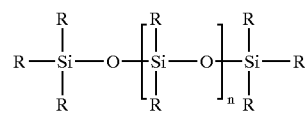
(11)

wherein R's denote a monovalent organic group, 30–100% by weight of all the organic groups are phenyl groups and the other organic groups are at least one group selected from vinyl group-substituted organic groups, alkylalkoxy groups of 1–6 carbon atoms, alkyl groups of 1–6 carbon atoms, amino group-substituted organic groups, epoxy group-substituted organic groups, hydroxyl group-substituted organic groups and mercapto group-substituted organic groups, and n is a positive number of 5–100 as an average value.

11. An epoxy resin composition for encapsulating semiconductors according to claim 1, 2 or 3 which contain at least one ion scavenger selected from a compound represented by the following formula (12), a compound represented by the following formula (13) and zinc oxide in an amount of 0.01–1.0% by weight based on the total weight of the epoxy resin composition:

$$Mg_aAl_b(OH)_{2a+3b-2c}(CO_3)_c \cdot dH_2O \quad (12)$$

wherein $0 < b/a \leq 1$, $0 \leq c/b < 1.5$, and d is 0 or a positive integer, and $$BiO_a(OH)_b(NO_3)_c(HSiO_3)_d \quad (13)$$

wherein a=0.9–1.1, b=0.6–0.8, c+d=0.2–0.4, and d/c= 0–2.0.

12. An epoxy resin composition for encapsulating semiconductors according to claim 1, 2 or 3, wherein an amount of bromine atom and that of antimony atom contained in the total epoxy resin composition is less than 0.1% by weight, respectively.

13. A semiconductor device wherein semiconductor elements are encapsulated with the epoxy resin composition for encapsulating semiconductors according to claim 1, 2 or 3.

* * * * *